Aug. 26, 1969
A. W. PRESCOTT
3,463,045
DRILLING SCREW
Filed May 10, 1966
2 Sheets-Sheet 2
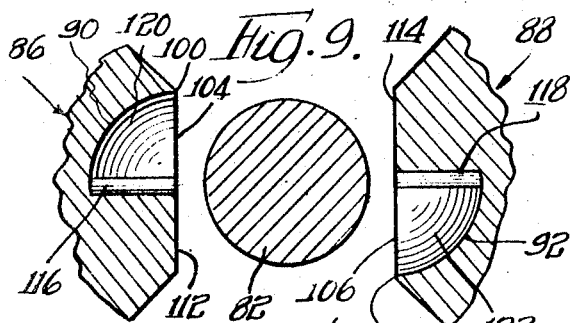
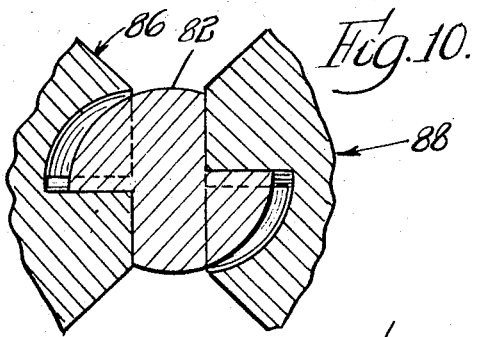
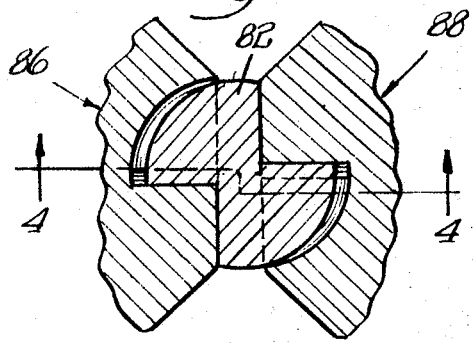
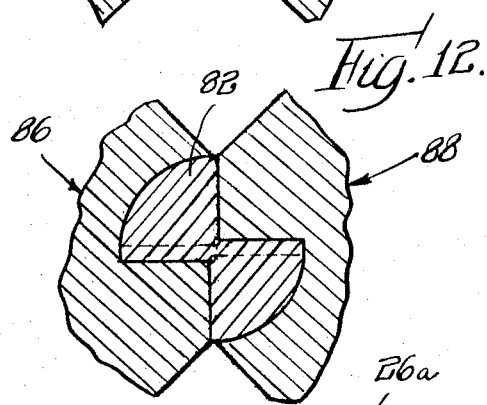
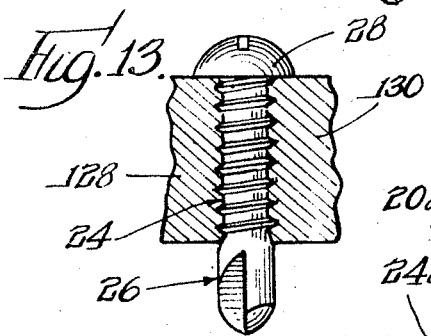
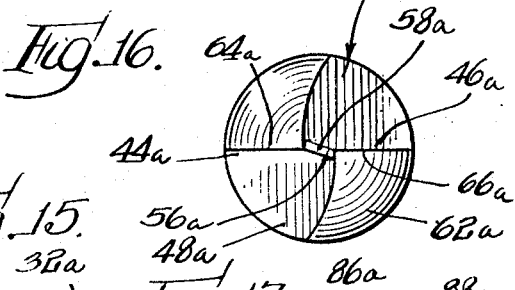
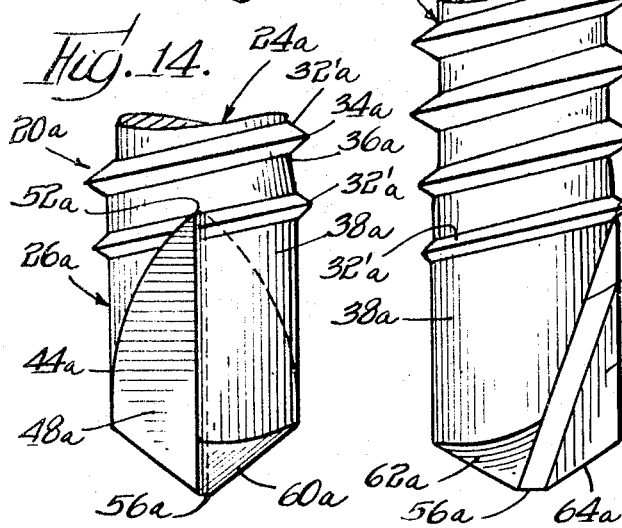
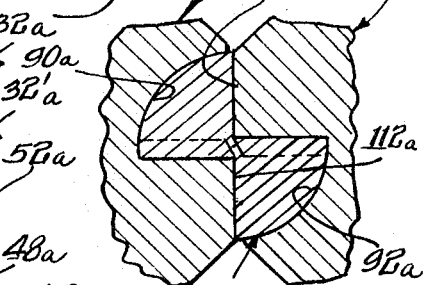
Inventor
Arthur W. Prescott
By: Olson, Trexler
Wolters & Bushnell
attys.

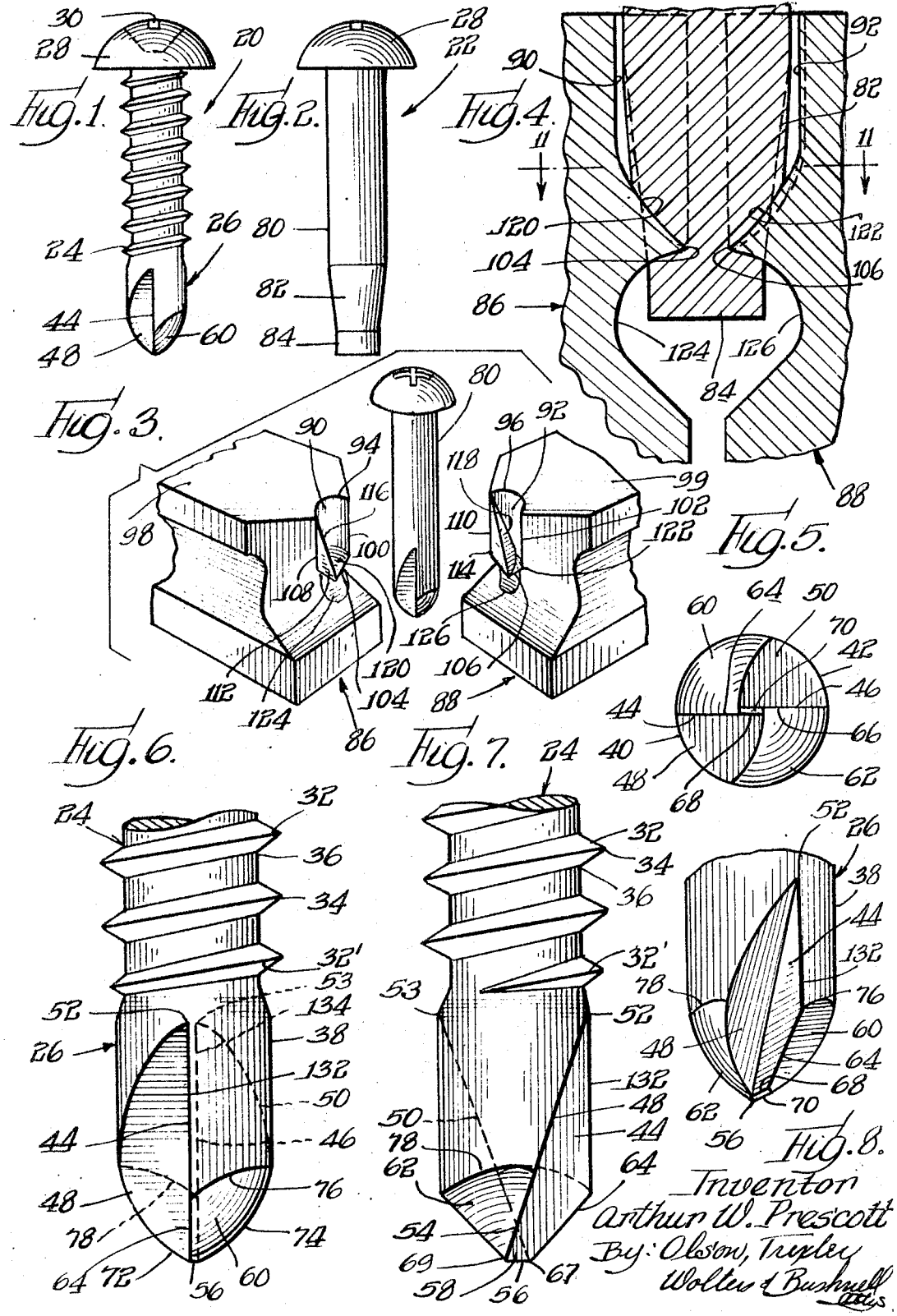

United States Patent Office 3,463,045
Patented Aug. 26, 1969

3,463,045
DRILLING SCREW
Arthur W. Prescott, Elgin, Ill., assignor to Illinois Tool
Works Inc., Chicago, Ill., a corporation of Delaware
Filed May 10, 1966, Ser. No. 548,892
Int. Cl. F16b 25/00; B21h 3/08
U.S. Cl. 85—41                                    6 Claims

ABSTRACT OF THE DISCLOSURE

There is disclosed a drilling screw having a forged drilling tip. The forging is accomplished so as to provide flutes in a first pair of diagonally opposite quadrants of the tip while the remaining pair of diagonally opposite quadrants present rounded or convex end surfaces extending substantially continuously between the flutes. First surfaces of the flutes intersect peripheral surfaces of the tip to provide cutting edges and the rounded surfaces are relieved behind these cutting edges. The flutes extend across a plane containing the central axis of the screw so as to define therebetween a narrow web providing the screw with a relatively sharp tip including continuations of the aforementioned cutting edges.

---

The present invention relates to a novel screw structure and more specifically to a novel drilling screw.

There are many applications where the use of self-drilling and tapping screws is highly desirable in order to facilitate easy and economical assembly of parts. A variety of self-drilling screw structures have heretofore been proposed. Many of these have been considered to be significant advances in the art and have been successfully used, especially for particular purposes. It has been noted however that certain of these heretofore proposed devices have required use of relatively costly production or manufacturing procedures. In addition certain of such heretofore suggested screws have been constructed so as to obtain only a relatively inefficient drilling action.

It is an important object of the present invention to provide a novel drilling screw structure and method of producing the same whereby the screw is relatively highly efficient in operation and can be mass produced cheaply.

More specifically it is an important object of the present invention to provide a novel drilling screw structure and method of producing the same by pinch-pointing or forging and so that relieved, well-supported and highly efficient cutting or drilling edges are obtained at the entering end of the screw.

A further important object of the present invention is to provide a novel drilling screw and method of making the same, which screw has a relatively strong and rugged entering end or drilling tip portions.

Still another object of the present invention is to provide a novel drilling screw having an entering end or tip portion formed for effectively cutting a hole in a workpiece in a manner which will facilitate subsequent starting of threads of the screw into the workpiece.

One embodiment of the present invention contemplates the inclusion of a forged drilling tip on a screw, said tip having flutes in a first pair of diagonally opposite quadrants while the remaining quadrants are substantially uninterrupted and present rounded or convex end surfaces. First surfaces of the flutes intersect the periphery of the tip and provide cutting edges at the intersections and the rounded end surfaces support but are relieved behind the cutting edges. The flutes are forged so as to traverse a plane containing the longitudinal axis of the screw to thereby define therebetween a narrow web providing the screw with a relatively sharp tip and including continuations of the cutting edges.

Other objects and advantages of the present invention will become apparent from the following description and the accompanying drawings wherein:

FIG. 1 is an elevational view showing a screw incorporating features of the present invention;

FIG. 2 is an elevational view showing a headed and unthreaded blank utilized in producing a screw in accordance with the features of the present invention;

FIG. 3 is an exploded perspective view showing the manner in which an entering end of the blank is pinch-pointed or forged in accordance with the features of the present invention;

FIG. 4 is an enlarged fragmentary sectional view taken generally along lines 4—4 in FIG. 11 and showing an intermediate step in the process of forging the entering end or drilling tip of the screw in accordance with features of the present invention;

FIG. 5 is an enlarged end view of the screw tip portion shown in FIG. 1;

FIG. 6 is a fragmentary side elevational view of a portion of the screw shown in FIG. 1;

FIG. 7 is an elevational view similar to FIG. 6 but showing the screw turned 90° from the position shown in FIG. 6;

FIG. 8 is a fragmentary elevational view showing an entering end portion of the screw turned 45° from the positions shown in both FIGS. 6 and 7;

FIGS. 9, 10, 11 and 12 are sectional views taken on the same plane as indicated by the sectional line 11—11 in FIG. 4 and respectively showing successive positions of pinch-pointing or forging dies during processing of a screw blank;

FIG. 13 is a sectional view on a reduced scale showing the manner of forming the threads on the screw blank;

FIG. 14 is a fragmentary elevational view similar to FIG. 6 but showing a modified form of the present invention;

FIG. 15 is an elevational view of the modified screw structure turned 90° from the position shown in FIG. 14;

FIG. 16 is an entering end view of the modified screw structure shown in FIGS. 14 and 15; and FIG. 17 is a fragmentary sectional view similar to FIG. 12 but showing the manner in which the modified screw structure is formed.

Referring now more specifically to the drawings wherein like parts are designated by the same numerals throughout the various figures, a screw 20 incorporating features of the present invention is shown in FIGS. 1 and 5 through 8. The screw 20 is, in accordance with features of the present invention, formed from a blank 22 shown in FIG. 2 in a manner which will be described fully below.

The finished screw 20 comprises an elongated shank portion 24 which merges with an entering end or drilling tip portion 26. A trailing end of the shank portion is preferably provided with an enlarged head 28 having suitable driving tool accommodating slot means 30 formed therein.

Helical thread convolutions 32 are rolled on the shank portion 24. Preferably the convolutions extend from adjacent the head to the entering end portion or drilling tip 26, and, if desired, the convolutions may be extended onto the entering end portion or tip 26. The thread convolutions 32 are preferably formed so as to have a substantially uniform crest 34 of predetermined diameter throughout a major portion of the shank. However, one or more of the convolutions designated 32′ adjacent to or merging with the entering end or tip portion 26 has a progressively decreasing crest diameter or height in a direction extending toward the tip so as to facilitate starting of the thread convolutions into a workpiece. As shown best in FIGS. 6 and 7, the thread convolutions 32 are spaced apart axially of the screw shank and the roots 36 of the threads have a predetermined substantially uniform diameter which is less than the maximum diameter of the entering end portion or drilling tip 26 as will be described more in detail below.

The enteritng end portion or drilling tip 26 is pinch-pointed or forged so as to have a generally cylindrical body 38. Oppositely disposed flutes 40 and 42 are formed in the tip body. These flutes are respectively defined by first substantially flat parallel surfaces 44 and 46 facing in opposite directions and located substantially at but slightly offset oppositely from a parallel plane bisecting the screw shank. The flutes are further defined by second surfaces 48 and 50 respectively perpendicular to the surfaces 44 and 46 and disposed in planes which are oppositely inclined with respect to the longitudinal axis of the screw.

As shown best in FIGS. 5 and 7, the inclined flute surfaces 48 and 50 have a minimum or zero depth at starting points 52 and 53 respectively adjacent the trailing end of the tip portion and extend so that the planes thereof intersect each other at a point 54 (see FIG. 7) coincident with the longitudinal axis of the screw and spaced axially inwardly from a free terminal edge or tip 56 of the screw. Thus the entering end portion is formed with a narrow web element 58 between the imaginary point 54 and the tip 56. Opposite sides of the web portion 58 are in fact continuations of the flute surfaces 44 and 46. This narrow web or tip portion which has a triangular configuration as shown in FIG. 7 provides the screw with a strong well-supported yet relatively thin or sharp point for facilitating initial entry into a workpiece during a drilling operation.

The end portion 26 of the screw is formed with end surfaces 60 and 62 between the flutes. The surfaces 60 and 62 are respectively intersected by the flute surfaces 44 and 46 along substantially straight edges 64 and 66 which flair outwardly and rearwardly from junctions 67 and 69 with opposite ends or corners of the web portion 58. As indicated in FIG. 7 these junctions which also coincide with the planes of the oppositely inclined flute surfaces are located at opposite sides of the central axis of the screw but at the same time are close together so that the length of the tip edge 56 is short for providing the screw with a sharp work-penetrating tip. The diverging edges 64 and 66 are continuations of edges 68 and 70 at opposite sides of the web element and serve therewith as cutting or drilling edges for the tip portion of the screw.

In order to increase the effectiveness of the cutting action of the edges 64 and 66, the end surfaces 60 and 62 are relieved immediately behind the edges whereby to avoid interference with the work. At the same time the end surfaces 60 and 62 are rounded and approach the configuration of a segment of a sphere so as to impart improved strength and resistance to wearing or breakage. While, as indicated, the end surfaces 60 and 62 approach the configuration of a segment of a sphere, they are slightly flattened so as to provide the aforementioned relief behind the cutting edges. In other words, the radius of curvature of the end surfaces 60 and 62 varies and is greater than the radius of the generally cylindrical tip portion body 38. This configuration is shown best in FIGS. 6 and 8 wherein are shown curved edges 72 and 74 at junctions between the flute surfaces 48 and 50 and the end surfaces 60 and 62 respectively. As shown, the curved edges 72 and 74 extend axially of the screw shank a distance substantially greater than the axial extent of the cutting edges 64 and 66. This relationship is further brought out by the configuration of junction lines 76 and 78 between the end surfaces 60 and 62 and cylindrical side surfaces of the body 38.

As previously indicated, the screw 20 is in accordance with a feature of the present invention, formed from the blank 22. The blank is initially provided with the previously described head portion 28 from which extends a smooth unthreaded shank 80. The shank portion 80 corresponds to the previously described threaded shank portion 24, but initially the shank portion 80 has a substantially uniform diameter which is less than the maximum diameter of the crests 34 of the thread convolutions 32 and greater than the diameter of the roots 36.

The shank portion 80 of the screw blank merges with a tapering or conical portion 82 which in turn merges with a reduced diameter free end portion 84. The axial length of the tapering portion 82 is similar in length to the entering end or tip portion 26 of the finished screw. Furthermore, the degree to which the portion 82 is tapered is related to the size and position of the flutes in the finished screw so that when the tip portion is forged in the manner described below, the resulting cylindrical body portion 38 will have a diameter which is substantially uniform and substatnially the same as the initial diameter of the unthreaded shank portion 80.

In order to form the drilling tip portion in accordance with the present invention, pinch-pointing or forging dies 86 and 88 shown in FIGS. 3, 4 and 9–12 are used. These dies are adapted to be mounted in and actuated by apparatus of known construction which need not be described in detail. As is known, such machines are capable of operating at high speeds so that screw blanks may be processed and formed with drilling tips in accordance with the present invention at rates, which for example, may be on the order of several hundred per minute.

The dies 86 and 88 are identically constructed and are mounted in directly opposed relationship for reciprocable movement between a fully opened position as shown in FIG. 9 and a fully closed position as shown in FIG. 12 during a screw blank processing operation.

The dies 86 and 88 are respectively formed with identical cavities 90 and 92 having upper ends in the form of segments of a cylinder as indicated by semi-circular lines 94 and 96 at junctions between the cavity surfaces and upper surfaces 98 and 99 of the die block. The radius of the cavities 90 and 92 at the upper ends thereof is substantially the same as the radius of the unthreaded shank portion 80 of the screw blank. The cavities 90 and 92 are respectively defined by straight vertical cutting edges 100 and 102 along one side thereof which edges serve to confine the blank during a forging operation and to trim any flashing therefrom as will be described more in detail below. The edges 100 and 102 respectively merge with downwardly and inwardly inclined edges 104 and 106 which serve to trim off the extra tip portion 84 of the screw blank along the previously described straight cutting edges 64 and 66.

As shown in the drawings and particularly in FIG. 3, the cavities 90 and 92 of the die blocks are partially filled with lands 108 and 110 respectively defined by flat forwardly facing anvil surfaces 112 and 114 and by inclined side surfaces 116 and 118 perpendicular thereto. The construction is such that the surfaces 112 and 114 are adapted to form the flute surfaces 44 and 46 while the arrangement of the die surfaces 116 and 118 determines the arrangement of the flute surfaces 48 and 50.

Lower end portions of the die cavities are respectively formed with rounded surfaces 120 and 122. These rounded surfaces which extend from the intersections with the cutting edges 104 and 106 provide mold forms against which the material of the screw blank is pressed and forged for obtaining the previously described curved and relieved end surfaces 60 and 62 of the screw drilling tip portion. In other words, the surface portions 120 and 122 of the dies correspond in configuration to the previously described shape of the screw end surfaces 60 and 62.

When the dies are brought together during a blank forming operation, the cutting edges 100 and 104 register with the flat surface 114 while the cutting edges 102 and 106 register with the flat surface 112 for trimming the screw tip to the previously described configuration. As shown in FIGS. 3 and 4, the die blocks are relieved as at 124 and 126 beneath the lower ends of the cutting edges 104 and 106 so as to provide clearance for the excess tip portion 84 of the blank.

When forming a drilling tip on a blank in accordance with the present invention, the blank is first placed between the open dies as shown in FIG. 9. Then the dies are moved together successively through the positions shown in FIGS. 10 and 11 to the final position shown in FIG. 12. During such movement, the land portions 108 and 110 of the dies progressively displace the material of the blank tapered portion 82 in order to form the previously described flutes. The initially tapering configuration of the blank portion 82 shown in FIG. 2 and in broken lines in FIG. 4 is correlated with the configuration of the die so that this displacement of the material begins adjacent the large diameter end of the shank portion 82 and progressively increases toward the small diameter end. As the dies move toward the closed position of FIG. 12, it is seen that the blank material from generally diagonally opposite quadrants is forced by the land of each die into the pocket of the opposite die. As this action progresses, the material is forced from the initially tapered or conical configuration as indicated by broken lines in FIG. 4 toward the generally cylindrical configuration of the sides of the pockets. Furthermore, the material is forced or extruded axially and radially against the rounded surfaces 120 and 122 at the lower ends of the pockets as shown in an intermediate stage in FIG. 4 for obtaining the end surfaces 60 and 62. This forming action is completed as the die is moved to the fully closed position shown in FIG. 12 and at the same time the lower excess end portion 84 is trimmed from the remainder of the blank. The volume of the material originally in the blank portion 82 is preferably at least slightly in excess of that needed for the finished tip and such excess material is trimmed away by the dies during the forming operation.

After the drilling tip has been formed as described hereinabove, the blank is passed between thread rolling dies 128 and 130 as shown in FIG. 13. The construction of such thread rolling dies and the operation thereof is well known and need not be described in detail. It suffices to state that the action is such that the thread convolutions 32 are formed as previously described so that the crest diameter thereof is greater than the diameter of the unthreaded shank portion 80 while the root diameter is less than the diameter of the unthreaded shank portion 80 and also less than the diameter of the tip body 38. Thus, the cutting edges 64 and 66 are adapted to drill a hole in a workpiece having a diameter greater than the root diameter of the threads and continuations of these cutting edges indicated by the numerals 132 and 134 and extending along the cylindrical sides of the tip body 38 are adapted to ream out the aperture in the workpiece to a diameter greater than the root diameter of the threads. Also as previously indicated, the threads may be rolled so that they terminate substantially at the upper end of the drilling tip portion, or the threads may be formed so as to extend at least partially along the tip portion. Furthermore, thread convolutions may even be extended so as to be intersected by the flutes. Preferably any such threads extending along the drilling tip portion are formed so as to progressively decrease in height and diameter toward the extreme tip of the screw. After the forming operations have been completed the screws which are formed from steel or other suitable metal materials may be heat-treated and hardened for enabling them to be applied to workpieces formed from metal or other hard substances.

In FIGS. 14 through 17 there is shown a slightly modified form of the present invention wherein the screw structure is similar to that described above as indicated by the application of identical reference numerals with the suffix $a$ added to corresponding elements. The screw in this embodiment may be formed by the same method as that described above and differs only in that the dies are modified for locating the drilling or cutting edges 64a and 66a in a common plane which also contains a longitudinal axis of the screw. In addition, the die is slightly modified so that the central web or tip portion 58a and opposite sides thereof which are continuations of the surfaces 44a and 46a are inclined slightly diagonally with respect to the aforementioned plane. In other words, the extreme tip edge 56a is disposed slightly diagonally at an angle with respect to the common plane of the cutting edges 64a and 66a. For example the angle of inclination may be on the order of about 15°.

The opposite cutting edges 64 and 66 in the previously described embodiment are, as indicated, only slightly offset with respect to each other and from a plane bisecting the screw so that there is little tendency for the screw to wobble as it is being driven into a workpiece. However, the arrangement shown in FIGS. 14–16 wherein these corresponding cutting edges are in the same plane further promotes a straight and efficient drilling action. Screw 20a as disclosed also shows how the thread convolutions 32'a may be extended along the tip portion 26a, but it is to be understood that these threads could be terminated above the tip portion, if desired. In general, the arrangement should be such that the length of the unthreaded portion of the tip equals or exceeds the thickness of the workpiece to which the screw is to be applied. This enables the drilling operation to be completed before the threads engage the workpiece.

While preferred embodiments of the present invention have been shown and described herein, it is obvious that many details may be changed.

The invention is claimed as follows:

1. A drilling screw comprising an elongated shank, driving tool accommodating means integral with a trailing end of said shank, said shank including a forged drilling end portion at a leading end thereof, and helical thread convolutions extending along said shank and having a predetermined maximum crest diameter and a smaller root diameter, said drilling end portion comprising a body having a diameter less than said predetermined crest diameter and greater than said root diameter, a pair of oppositely disposed forged flute means in quadrants of said body located diagonally from each other substantially at opposite sides of a first plane containing the longitudinal axis of said shank, said body including outwardly and axially rearwardly flaring entering end surfaces substantially traversing quadrants between said flute means, said flute means being partially defined by first flute surfaces intersecting said end surfaces at cutting edges adjacent said plane, said flute surfaces traversing a second plane in the vicinity of a free terminal end of said body, said second plane also containing said axis and being disposed perpendicular to said first plane, said body including a narrow web between said flute surfaces at said free terminal end and presenting a narrow tip edge for initial engagement with a workpiece during a drilling operation, said cutting edges including portions disposed substantially in a common plane and traversing said web portion and defining opposite side corners of said tip edge, said cutting edges including additional portions flaring outwardly, and said end surfaces being forged and relieved behind said cutting edges with said end surfaces having a convex configuration and varying radii of curvature greater than the radius of said body.

2. A drilling screw, as defined in claim 1, wherein said cutting edges are substantially parallel to and slightly oppositely offset from said first plane.

3. A drilling screw, as defined in claim 1, wherein major parts of said cutting edges are disposed substantially in said first plane, and said portions of said cutting edges and said web are inclined about the axis of the shank with respect to said first plane.

4. A drilling screw, as defined in claim 1, wherein said narrow web has an inverted generally triangular configuration.

5. A drilling screw, as defined in claim 1, wherein said body comprises generally cylindrical side surfaces, said first flute surfaces intersecting said side surfaces at longitudinally extending cutting and reaming edges located on a diameter greater than said root diameter.

6. A drilling screw, as defined in claim 5, wherein said flute means are partially defined by second flute surfaces respectively perpendicular to said first flute surfaces and extending from trailing ends of said cutting and reaming edges diagonally across said second plane and to opposite corners of said tip edge.

References Cited

UNITED STATES PATENTS

| | | | |
|---|---|---|---|
| 3,079,831 | 3/1963 | Gutshall | 85—47 |
| 3,125,923 | 3/1964 | Hanneman | 85—47 |
| 3,241,426 | 3/1966 | Gutshall | 85—47 |
| 3,318,182 | 5/1967 | Carlson | 85—41 |

FOREIGN PATENTS

| | | |
|---|---|---|
| 639,198 | 5/1962 | Italy. |
| 976,849 | 12/1964 | Great Britain. |
| 690,269 | 4/1953 | Great Britain. |

MARION PARSONS, Jr., Primary Examiner

U.S. Cl. X.R.

10—10